(12) United States Patent
Jo et al.

(10) Patent No.: US 8,597,558 B2
(45) Date of Patent: Dec. 3, 2013

(54) METHOD FOR FABRICATING SOFT MOLD

(75) Inventors: Gyoo Chul Jo, Gunpo-si (KR); Jin Wuk Kim, Uiwang-si (KR)

(73) Assignee: LG Display Co., Ltd., Seoul (KR)

( * ) Notice: Subject to any disclaimer, the term of this patent is extended or adjusted under 35 U.S.C. 154(b) by 1807 days.

(21) Appl. No.: 11/311,226

(22) Filed: Dec. 20, 2005

(65) Prior Publication Data
US 2006/0290024 A1  Dec. 28, 2006

(30) Foreign Application Priority Data
Jun. 24, 2005  (KR) .................. 10-2005-0055197

(51) Int. Cl.
*B29C 33/40* (2006.01)
(52) U.S. Cl.
USPC ............................ 264/220; 264/225; 264/226
(58) Field of Classification Search
USPC .................................. 264/220, 225, 226, 227
See application file for complete search history.

(56) References Cited

U.S. PATENT DOCUMENTS

| | | | | |
|---|---|---|---|---|
| 4,801,518 | A | * | 1/1989 | Yamashita et al. ............ 430/325 |
| 5,071,236 | A | * | 12/1991 | Sudo et al. .................... 359/742 |
| 2003/0138704 | A1 | * | 7/2003 | Mei et al. .......................... 430/5 |
| 2005/0238967 | A1 | * | 10/2005 | Rogers et al. ..................... 430/5 |
| 2005/0273995 | A1 | * | 12/2005 | Kanagasabapathi et al. ........................... 29/592.1 |

OTHER PUBLICATIONS

Cheng, X., L.J. Guo, A combined-nanoimprint-and-photolithography patterning technique, Microelectronic Engineering, vol. 71 (2004), pp. 277-282.*

* cited by examiner

*Primary Examiner* — James Sanders
(74) *Attorney, Agent, or Firm* — McKenna Long & Aldridge, LLP (57) ABSTRACT

A method for fabricating a soft mold is disclosed, in which process matching is high regardless of a size of a master mold for forming the soft mold. The method for fabricating a soft mold includes arranging a master mold on a jig, forming a pre-polymer layer in the jig, attaching a back-plane substrate onto the pre-polymer layer, selectively curing the pre-polymer layer to selectively form a polymer layer, stripping the polymer layer and the pre-polymer layer from the jig and the master mold, and removing the pre-polymer layer that is not cured.

9 Claims, 9 Drawing Sheets

FIG. 1A

-Prior art-

FIG. 1B

-Prior art-

FIG. 1C

-Prior art-

FIG.2A

-Prior art-

FIG.2B

-Prior art-

METHOD FOR FABRICATING SOFT MOLD

This application claims the benefit of the Korean Patent Application No. P2005-0055197, filed on Jun. 24, 2005, which is hereby incorporated by reference for all purposes as if fully set forth herein.

BACKGROUND OF THE INVENTION

1. Field of the Invention

The present invention relates to a soft mold, and more particularly, to a method for fabricating a soft mold, in which the soft mold is properly used if a size of a master mold is smaller than that of a substrate to be patterned.

2. Discussion of the Related Art

Generally, a soft mold is fabricated by casting a rubber having elasticity in a mold and concaving or embossing a pattern depending on a shape of the mold.

The soft mold is used to form a fine pattern of a micro unit, such as a concave or embossed pattern. For example, the soft mold is used to form either a color filter on a color filter substrate of a liquid crystal display device or an electrode in an organic electroluminescent (EL) device.

The soft mold can be fabricated by curing an elastic polymer. Polydimethylsiloxane (PDMS) is widely used as the elastic polymer. In addition to PDMS, polyurethane or polyimide may be used as the elastic polymer.

Hereinafter, a related art process for fabricating a soft mold will be described with reference to the accompanying drawings.

Figure 1A:
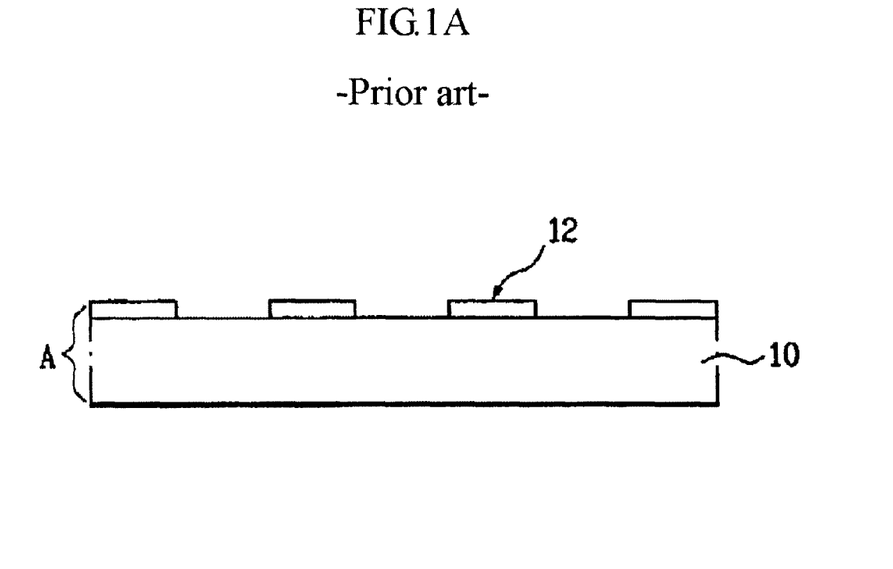
FIG. 1A to FIG. 1C are sectional views illustrating related art process steps of fabricating a soft mold.
Figure 1B:
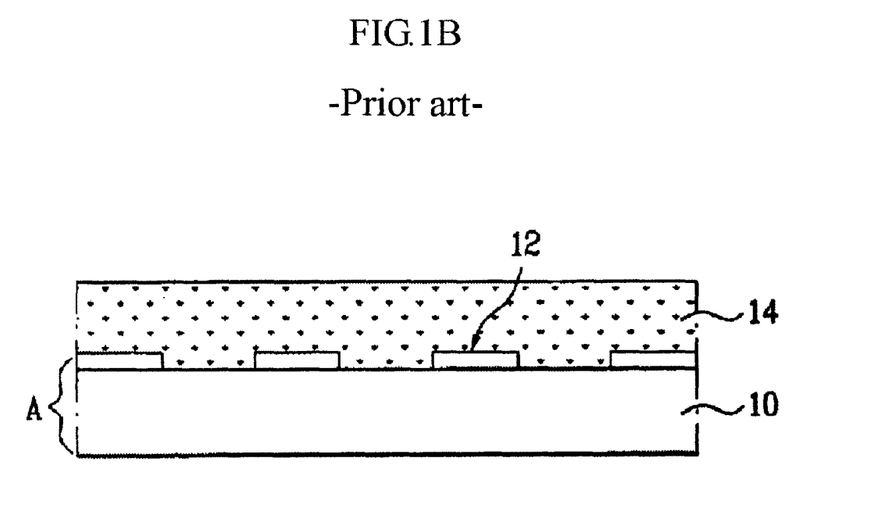
Figure 1C:
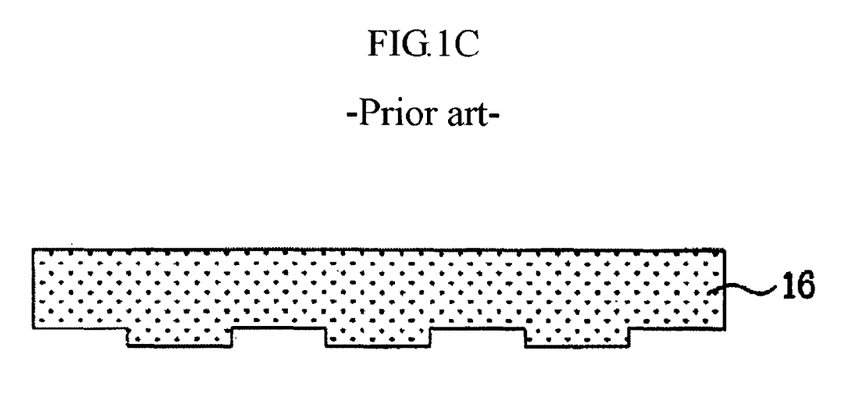

FIG. 1A to FIG. 1C are sectional views illustrating related art process steps of fabricating a soft mold.

As illustrated in FIG. 1A, a master A is prepared to concave or emboss a predetermined shape on a surface of a soft mold.

The master A is formed in such a manner that an insulating material such as $Si_3N_4$ or $SiO_2$ is deposited on an insulating substrate 10 such as a silicon substrate to form a preceding layer and the preceding layer is patterned by a photolithographic process to form a desired pattern 12.

At this time, the pattern 12 on the insulating substrate 10 may be formed of metal, photoresist or wax in addition to $Si_3N_4$ or $SiO_2$.

The master A is formed by the aforementioned process steps.

As illustrated in FIG. 1B, if the master A is completed, an elastic polymer (elastic rubber) solution of a pre-polymer state is cast on the master A to form a pre-polymer layer 14. PDMS is used as the elastic polymer.

Subsequently, the pre-polymer layer 14 is cured.

Next, as illustrated in FIG. 1C, a polymer layer in which the pre-polymer layer 14 is completely cured is referred to as a soft mold 16. The soft mold 16 is stripped from the master ('A' of FIG. 1B) so that the soft mold concaved or embossed in a predetermined shape on its surface is fabricated.

The related art soft mold is fabricated by the aforementioned process steps.

The soft mold fabricated as above is used in various fields of soft lithography, soft molding, capillary force lithography, and in-plane printing.

For mass production of the product based on the soft mold used in various fields, it is necessary to exactly align the soft mold.

Particularly, in the soft mold for in-plane printing, in case where a master mold is smaller than a substrate to be patterned, a threshold is formed in the mold to cause a problem when a fine pattern is formed.

This case will be described with reference to FIG. 2A and FIG. 2B.

Figure 2A:
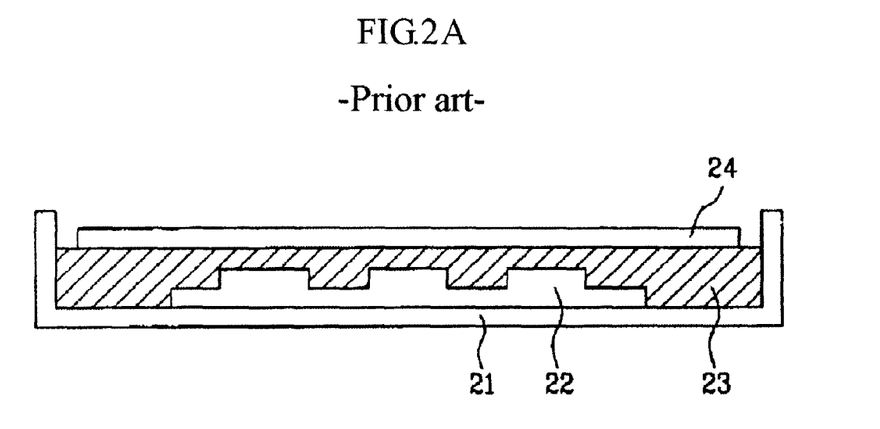
FIG. 2A and FIG. 2B are structural sectional views illustrating a master mold smaller than a substrate to be patterned.
Figure 2B:
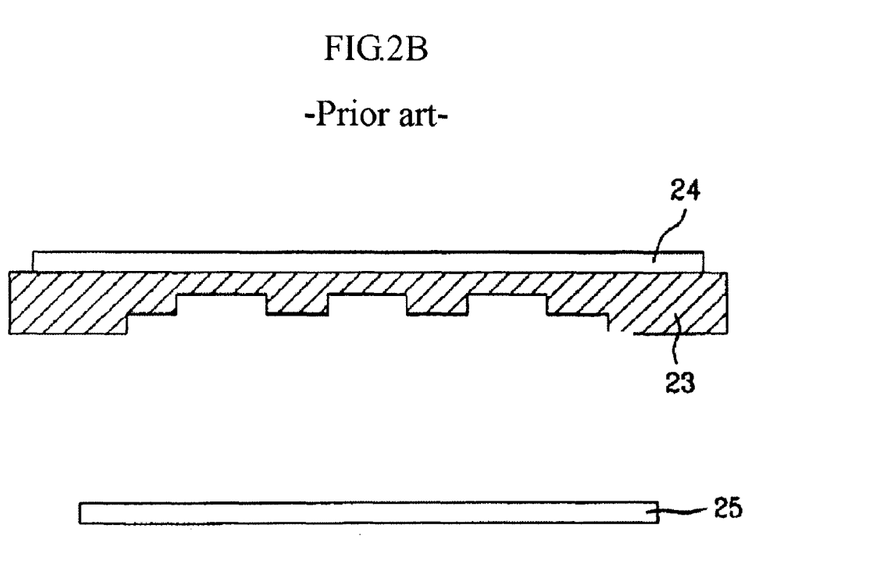

FIG. 2A and FIG. 2B are structural sectional views illustrating a master mold smaller than a substrate to be patterned.

As illustrated in FIG. 2A, after a master mold 22 is arranged on a rectangular mold shaped jig 21, a cured polymer layer 22 is formed in the jig 21 including the master mold 22. A back-plane substrate 24 is attached onto the cured polymer layer 22.

As illustrated in FIG. 2B, in a state that the back-plane substrate 24 is attached to the cured polymer layer 22, the jig 21 and the master mold 22 are stripped from the polymer layer 23 to form a soft mold attached with the back-plane substrate.

Afterwards, a substrate 25 for a fine pattern is arranged below the soft mold.

At this time, the master mold has a size greater than that of the substrate to be patterned.

However, if the substrate 25 to be finely patterned is greater than the master mold as illustrated in FIG. 2B, a threshold is formed at the corner of the mold.

The mold is not closely attached to the substrate 25 due to the threshold. Thus, the mold is spaced apart from the substrate 25 at a certain interval. Particularly, the mold is used for in-plane printing, a problem occurs in that the fine pattern is not formed.

SUMMARY OF THE INVENTION

Accordingly, the present invention is directed to a method for fabricating a soft mold, which substantially obviates one or more problems due to limitations and disadvantages of the related art.

An advantage of the present invention is to provide a method for fabricating a soft mold, in which process matching is high regardless of a size of a master mold for forming the soft mold.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for fabricating a soft mold according to the present invention includes arranging a master mold on a jig, forming a pre-polymer layer in the jig, attaching a back-plane substrate onto the pre-polymer layer, selectively curing the pre-polymer layer to selectively form a polymer layer, stripping the polymer layer and the pre-polymer layer from the jig and the master mold, and removing the pre-polymer layer that is not cured.

The pre-polymer layer is thermally cured or UV-cured.

The thermal curing is performed in a microwave oven.

The UV curing is performed using a mask having a light-transmitting portion and a light-shielding portion.

In another aspect of the present invention, a method for fabricating a soft mold includes arranging a master mold on a jig, forming a pre-polymer layer, which can be thermally cured, in the jig, attaching a back-plane substrate onto the pre-polymer layer, loading the master mold, the pre-polymer layer and the jig into a microwave oven, selectively thermal-curing the pre-polymer layer in the microwave oven to selectively form a polymer layer, stripping the polymer layer and the pre-polymer layer from the jig and the master mold, and removing the pre-polymer layer that is not cured.

The pre-polymer layer is formed of one selected from PDMS, polyimide, and epoxy.

The method further includes treating the back-plane substrate with a coupling agent before attaching the back-plane substrate onto the pre-polymer layer.

The coupling agent treatment is performed using a primer.

The pre-polymer layer that is not cured is dipped in a normal nucleic acid (n-Hxan) solution and then removed.

The master mold is formed in such a manner that an insulating material such as $Si_3N_4$ or $SiO_2$ is deposited on an insulating substrate such as a silicon substrate to form a preceding layer and then the preceding layer is patterned by a photolithographic process to form a desired pattern. The preceding layer is formed of metal, photoresist, or wax.

In other aspect of the present invention, a method for fabricating a soft mold includes arranging a master mold on a jig, forming a pre-polymer layer, which can be UV-cured, in the jig, attaching a back-plane substrate onto the pre-polymer layer, selectively UV-curing the pre-polymer layer using a mask having a light-transmitting portion and a light-shielding portion to selectively form a polymer layer, stripping the polymer layer and the pre-polymer layer from the jig and the master mold, and removing the pre-polymer layer that is not cured.

The pre-polymer layer is formed of one selected from polyurethane, polyurethane-acrylate, epoxy, and novolac. The pre-polymer layer that is not cured is dipped in a normal nucleic acid (n-Hxan) solution and then removed.

The master mold is formed in such a manner that an insulating material such as $Si_3N_4$ or $SiO_2$ is deposited on an insulating substrate such as a silicon substrate to form a preceding layer and then the preceding layer is patterned by a photolithographic process to form a desired pattern. The preceding layer is formed of metal, photoresist, or wax.

The method further includes treating the back-plane substrate with a coupling agent before attaching the back-plane substrate onto the pre-polymer layer.

The present invention is intended to solve a problem in which a fine pattern is not formed as a master mold is not closely attached to a substrate and thus is spaced apart from the substrate at a certain interval due to a threshold formed at a corner of the mold if the mold is smaller than a substrate for the fine pattern. In the present invention, the size of the mold is controlled regardless of the size of the master mold so that the threshold is not formed when the mold is in contact with the substrate for the fine pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

A method for fabricating a soft mold according to the first embodiment of the present invention will be described. FIG. 3A to FIG. 3F are sectional views illustrating process steps of fabricating a soft mold according to this first embodiment of the present invention.

In the first embodiment of the present invention, if a size of a master mold is smaller than that of a substrate for a fine pattern, a thermal curing material is used as a material of a soft mold so that a desired portion of the soft mold is selectively thermal-cured in a microwave oven and a portion of the soft mold which is not cured is removed, thereby fabricating the soft mold.

Figure 3A:
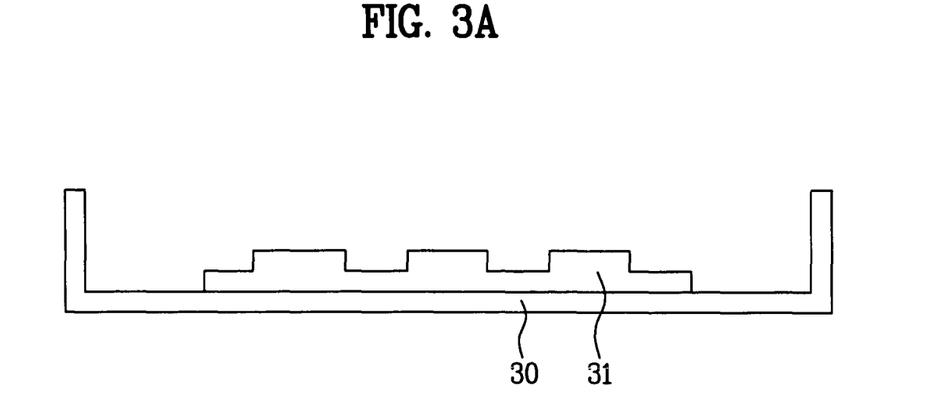
FIG. 3A to FIG. 3F are sectional views illustrating process steps of fabricating a soft mold according to the first embodiment of the present invention.

In the method for fabricating a soft mold according to the first embodiment of the present invention, as illustrated in FIG. 3A, a master mold 31 is arranged on a rectangular mold shaped jig 30. The master mold 31 is to concave or emboss a predetermined shape on a surface of a soft mold.

The master mold 31 is formed in such a manner that an insulating material such as $Si_3N_4$ or $SiO_2$ is deposited on an insulating substrate such as a silicon substrate to form a preceding layer and then the preceding layer is patterned by a photolithographic process to form a desired pattern.

At this time, the pattern on the insulating substrate may be formed of metal, photoresist or wax in addition to $Si_3N_4$ or $SiO_2$.

Figure 3B:
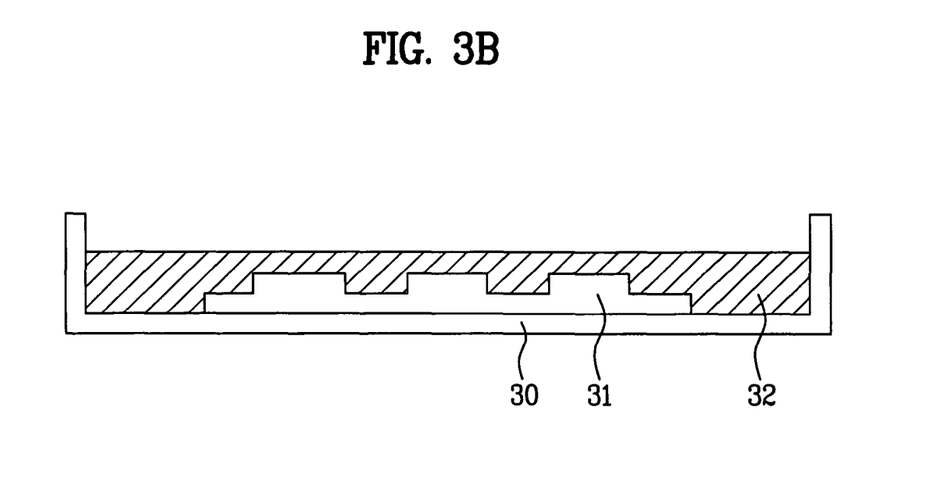

As illustrated in FIG. 3B, a pre-polymer layer 32 that can be thermally cured is formed in the jig 30 including the master mold 31.

The pre-polymer layer 32 may be formed of any one selected from PDMS, polyimide, and epoxy.

Figure 3C:
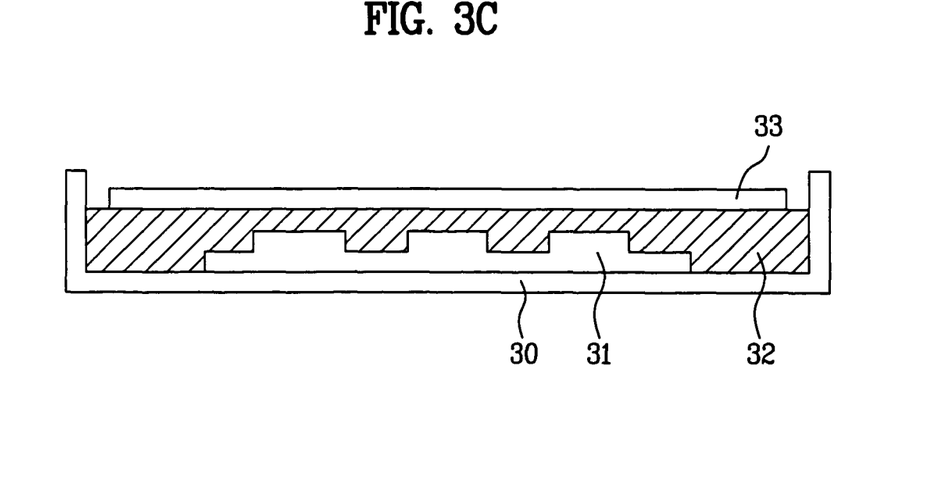

Afterwards, as illustrated in FIG. 3C, a back-plane substrate 33 is attached onto the pre-polymer layer 32.

Although not illustrated, the back-plane substrate 33 is treated with a coupling agent to improve adhesion between the pre-polymer layer 32 and the back-plane substrate. The coupling agent may be performed using a primer.

Next, the resultant is loaded into the microwave oven.

Figure 3D:
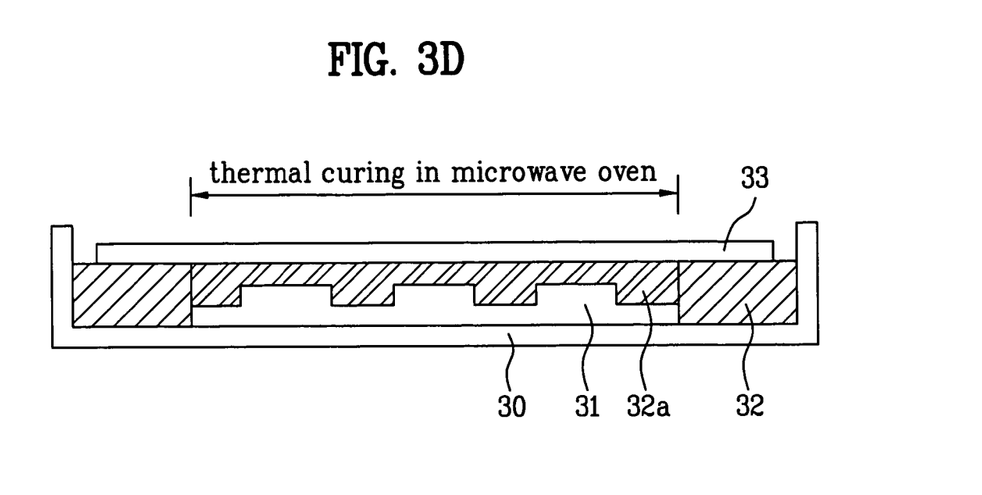

As illustrated in FIG. 3D, a coordinate for a thermal curing portion is set so that the pre-polymer layer 32 is selectively heated in the microwave oven to undergo a curing process. The heated pre-polymer layer 32 is varied to a polymer layer 32a. At this time, the thermal curing portion is formed with an area smaller than that of the substrate for a fine pattern.

A portion where the pre-polymer layer is not heated in the microwave oven is not cured and remains as the pre-polymer layer 32.

Figure 3E:
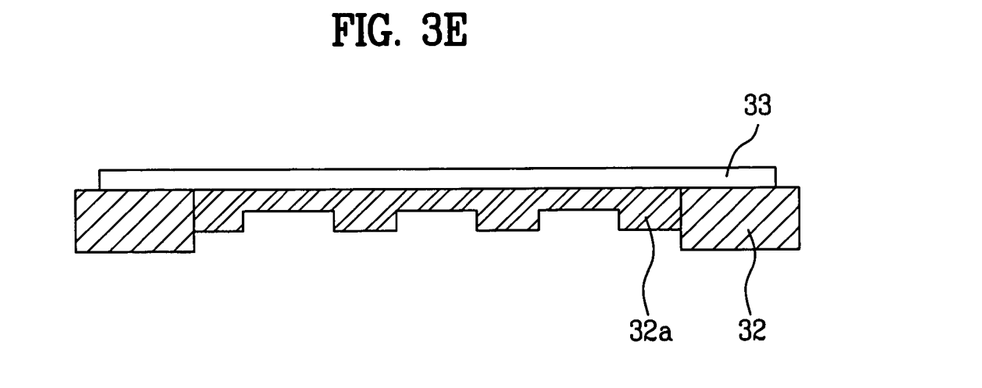

Next, as illustrated in FIG. 3E, the polymer layer 32a and the pre-polymer layer 32 are stripped from the jig 30 and the master mold 31.

Figure 3F:
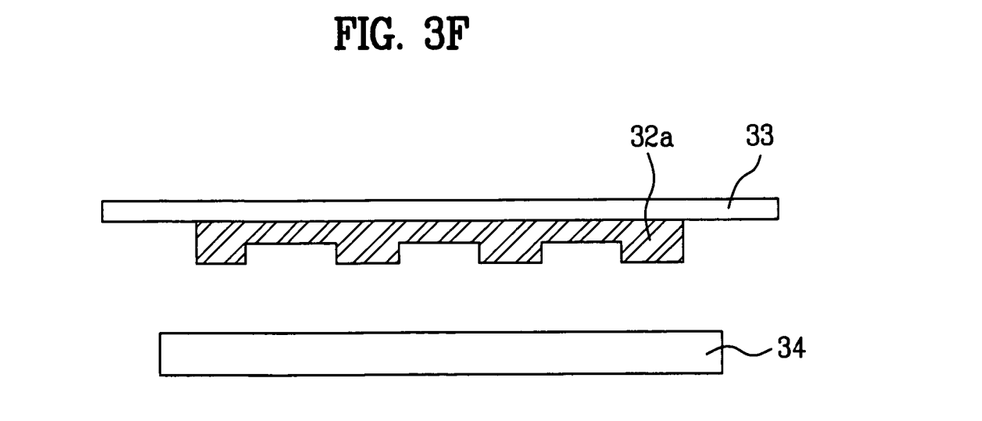

Afterwards, as illustrated in FIG. 3F, the pre-polymer layer 32 that is not cured is dipped in a normal nucleic acid (n-Hxan) solution and then is removed. Thus, the soft mold attached with the back-plane substrate 33 is completed.

As described above, the pre-polymer layer 32 is selectively thermal-cured to form the polymer layer 32a and the pre-polymer layer 32 that is not cured is removed. In this case, even though the master mold 31 is smaller than a substrate 34 for a fine pattern, a threshold is not formed between the soft mold and the substrate 34. Therefore, it is possible to desirably form the fine pattern.

A method for fabricating a soft mold according to the second embodiment of the present invention will be described. FIG. 4A to FIG. 4F are sectional views illustrating process steps of fabricating a soft mold according to the second embodiment of the present invention.

In the second embodiment of the present invention, if a size of a master mold is smaller than that of a substrate for a fine pattern, a UV curing material is used as a material of a soft mold so that a desired portion of the soft mold is selectively UV-cured using a mask and a portion of the soft mold which is not cured is removed, thereby fabricating the soft mold.

Figure 4A:
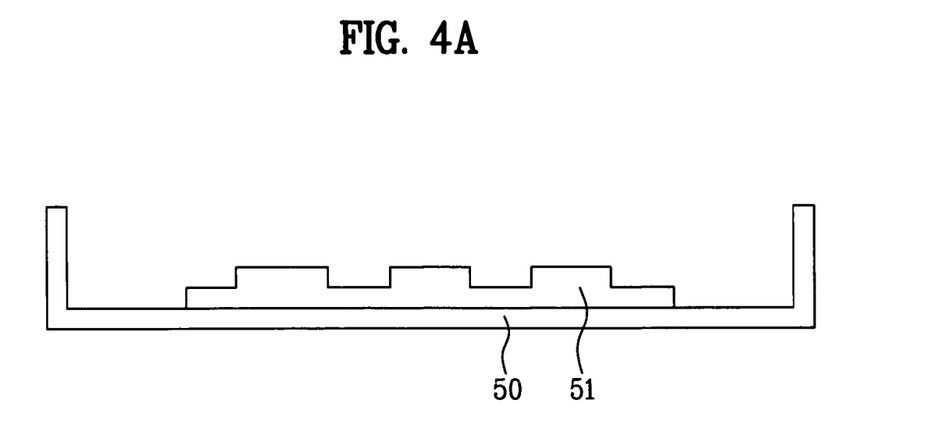
FIG. 4A to FIG. 4F are sectional views illustrating process steps of fabricating a soft mold according to the second embodiment of the present invention.

In the method for fabricating a soft mold according to the second embodiment of the present invention, as illustrated in FIG. 4A, a master mold 51 is arranged on a rectangular mold shaped jig 50. The master mold 51 is to concave or emboss a predetermined shape on a surface of a soft mold.

The master mold 51 is formed in such a manner that an insulating material such as $Si_3N_4$ or $SiO_2$ is deposited on an insulating substrate such as a silicon substrate to form a preceding layer and then the preceding layer is patterned by a photolithographic process to form a desired pattern.

At this time, the pattern on the insulating substrate may be formed of metal, photoresist or wax in addition to $Si_3N_4$ or $SiO_2$.

Figure 4B:
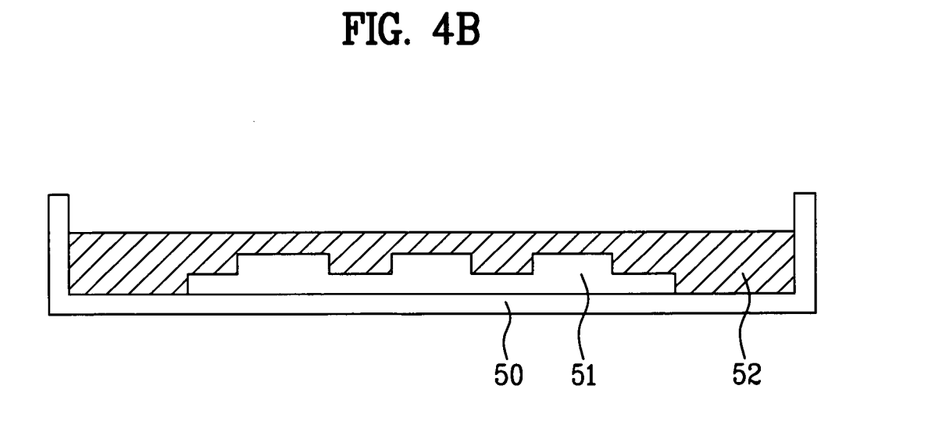

As illustrated in FIG. 4B, a pre-polymer layer 52 that can be UV-cured is formed in the jig 50 including the master mold 51.

The pre-polymer layer 52 may be formed of any one selected from polyurethane, polyurethane-acrylate, epoxy, and novolac.

Figure 4C:
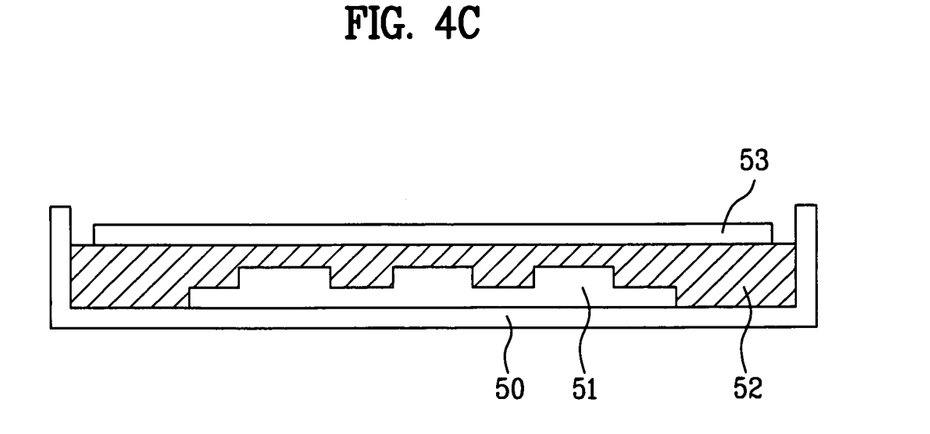

Afterwards, as illustrated in FIG. 4C, a back-plane substrate 53 is attached onto the pre-polymer layer 52.

Before the back-plane substrate 53 is attached onto the pre-polymer layer 52, although not illustrated, the back-plane substrate 53 is treated with a coupling agent to improve adhesion between the pre-polymer layer 52 and the back-plane substrate. The coupling agent may be performed using a primer. If the UV-cured material is used as the pre-polymer layer, the coupling agent treatment may be omitted.

Figure 4D:
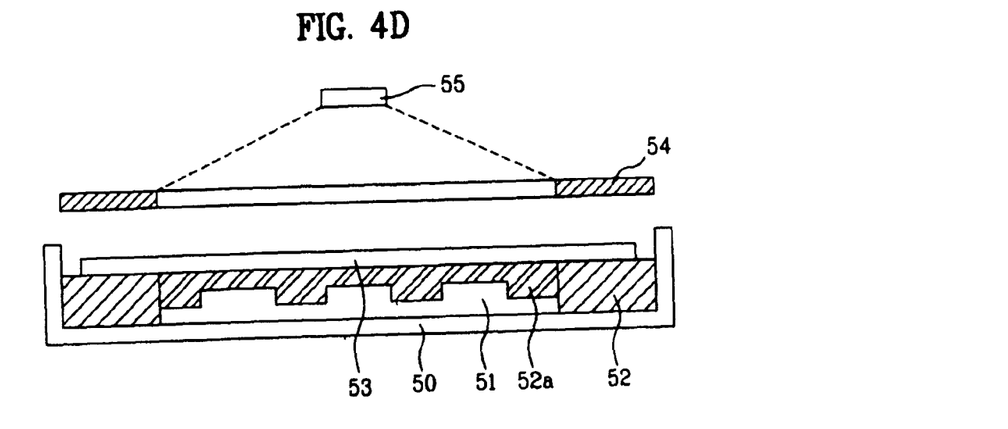

Next, as illustrated in FIG. 4D, a mask 54 that transmits light only in a UV-curing portion and shields light in the other portion is arranged on the resultant, and UV is irradiated from a UV lamp 55. Then, the UV is selectively irradiated to the pre-polymer layer 52 to selectively cure the pre-polymer layer 52. The pre-polymer layer 52 to which the UV is irradiated constitutes a polymer layer 52a. At this time, the UV-curing portion is set to be smaller than a substrate for a fine pattern. A portion where the pre-polymer layer is not UV-cured remains as the pre-polymer layer 52.

Figure 4E:
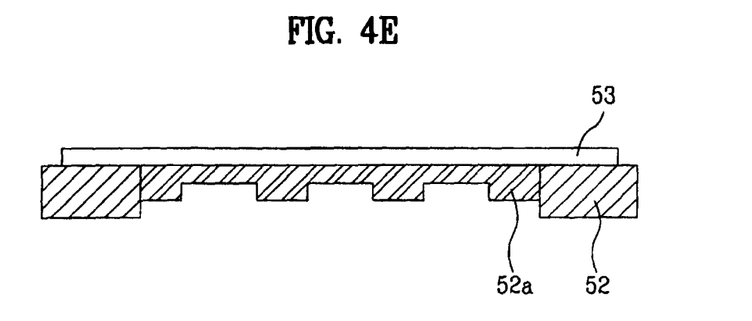

Next, as illustrated in FIG. 4E, the polymer layer 52a and the pre-polymer layer 52 are stripped from the jig 50 and the master mold 51.

Figure 4F:
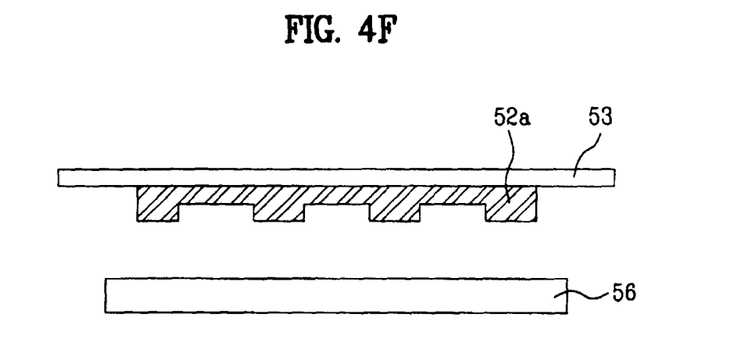

Afterwards, as illustrated in FIG. 4F, the pre-polymer layer 52 that is not cured is dipped in a normal nucleic acid (n-Hxan) solution and then is removed. Thus, the soft mold is completed, in which the polymer layer 52a is attached to the back-plane substrate 53.

After the pre-polymer layer is selectively UV-cured, the portion where the pre-polymer layer is not cured is removed. In this case, even though the master mold 51 is smaller than a substrate 56 for a fine pattern, the soft mold can be fabricated so as not to form a threshold between the soft mold and the substrate 56. Therefore, it is possible to desirably form the fine pattern using the soft mold.

As described above, the method for fabricating a soft mold according to the present invention has numerous advantages, including the following.

After the pre-polymer layer is selectively thermal-cured or UV-cured, the pre-polymer layer that is not cured is removed, so that the soft mold is completed. In this case, even though the master mold is smaller than the substrate for a fine pattern, the soft mold can be fabricated so as not to form the threshold between the soft mold and the substrate. Therefore, it is possible to desirably form the fine pattern.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for fabricating a soft mold used for patterning a substrate, comprising the sequence of steps of:
   arranging a master mold being smaller than that of the substrate, within a rectangular mold shaped jig;
   then forming a pre-polymer layer in the jig by filling at least a portion of the jig with a pre-polymer material to cover at least the master mold and an other portion on the jig beside the master mold;
   after forming the pre-polymer layer, attaching a back-plane substrate onto the pre-polymer layer;
   then forming a polymer layer by curing only a portion of the pre-polymer layer directly on the master mold, and leaving the other portion of the pre-polymer layer uncured beside the polymer layer;
   then stripping the polymer layer and the other portion of the pre-polymer layer from the jig and the master mold; and
   then removing the other portion of the pre-polymer layer from the polymer layer and the back-plane substrate,
   wherein the cured portion of the pre-polymer layer is set to be smaller than the substrate.

2. The method as claimed in claim 1, wherein the pre-polymer layer is thermally cured or UV-cured.

3. The method as claimed in claim 2, wherein the UV curing is performed using a mask that defines a light-transmitting portion and a light-shielding portion.

4. A method for fabricating a soft mold used for patterning a substrate, comprising the sequence of steps of:
   arranging a master mold being smaller than that of the substrate, within a rectangular mold shaped jig;
   then forming a pre-polymer layer, which can be UV-cured, in the jig by filling at least a portion of the jig with a pre-polymer material to cover at least the master mold and an other portion on the jig beside the master mold;
   after forming the pre-polymer layer, attaching a back-plane substrate onto the pre-polymer layer;
   then forming a polymer layer by UV-curing only a portion of the pre-polymer layer directly on the master mold, leaving the other portion of the pre-polymer layer uncured beside the polymer layer, using a mask above the back-plane substrate and a UV lamp above the mask;
   then stripping the polymer layer and the other portion of the pre-polymer layer from the jig and the master mold; and
   then removing the other portion of the pre-polymer layer from the polymer layer and the back-plane substrate, wherein the UV-cured portion of the pre-polymer layer is set to be smaller than the substrate, and wherein the mask has a light transmitting portion and a light-shielding portion.

5. The method as claimed in claim 4, wherein the pre-polymer layer is formed of one selected from polyurethane, polyurethane-acrylate, epoxy, and novolac.

6. The method as claimed in claim 4, wherein the other portion of the pre-polymer layer that is not cured is dipped in a normal nucleic acid (n-Hxan) solution and then removed.

7. The method as claimed in claim 4, wherein the master mold is formed in such a manner that an $Si_3N_4$ or $SiO_2$ is deposited on an insulating substrate to form a preceding layer and then the preceding layer is patterned by a photolithographic process to form a desired pattern.

8. The method as claimed in claim 7, wherein the preceding layer is formed of metal, photoresist, or wax.

9. The method as claimed in claim 4, further comprising treating the back-plane substrate with a coupling agent before attaching the back-plane substrate onto the pre-polymer layer.

* * * * *